United States Patent

[15] 3,681,536
[45] Aug. 1, 1972

Pask et al.

[54] ELECTRONIC TELEPHONE CALL RESTRICTING DEVICE

[72] Inventors: Arthur H. Pask; Robert E. Sparrow, both of Winnipeg, Manitoba; Roger J. Boulanger, St. Boniface, Manitoba, all of Canada

[73] Assignee: International Electric Research & Equipment Ltd., Winnipeg, Manitoba, Canada

[22] Filed: July 8, 1970

[21] Appl. No.: 53,147

[30] Foreign Application Priority Data

April 27, 1970 Canada ....................081,185

[52] U.S. Cl. ....................179/18 DA, 179/84 VF
[51] Int. Cl. ....................H04m 1/66
[58] Field of Search ..........179/18 DA, 189 R, 84 VF

[56] References Cited

UNITED STATES PATENTS

| | | | |
|---|---|---|---|
| 3,569,634 | 3/1971 | Amadasi | 179/18 DA |
| 3,553,382 | 1/1971 | Knox et al. | 179/18 DA |
| 3,539,731 | 11/1970 | Legedza | 179/84 VF |
| 3,436,487 | 4/1969 | Blane | 179/84 VF |

FOREIGN PATENTS OR APPLICATIONS

| | | | |
|---|---|---|---|
| 40,174 | 7/1968 | Finland | 179/18 DA |

*Primary Examiner*—Kathleen H. Claffy
*Assistant Examiner*—Thomas W. Brown
*Attorney*—Burns, Doane, Benedict, Swecker & Mathis

[57] ABSTRACT

This invention relates to an electronic telephone call restricting device adapted to be installed in a telephone line to prevent the use of a telephone for making unauthorized calls. The present invention comprises electronic means adapted to disable the telephone circuit when the first digit dialled is a designated digit. The present invention may be used with an ordinary dialling system or with a touch tone dialling system.

12 Claims, 3 Drawing Figures

ELECTRONIC TELEPHONE CALL RESTRICTING DEVICE

This invention relates to an electronic device which is adapted to be installed in a telephone line to prevent unauthorized usage of a subscriber's telephone.

It has been found that many telephone subscribers having telephones in locations which are accessible to young children, employees or the public, have incurred expenses as a result of the use of such telephones to make unauthorized long distance calls, particularly by means of direct dialling.

Although various electro-mechanical devices forming part of the equipment in a telephone exchange have been proposed to prevent unauthorized use of telephones, most telephone companies do not use such equipment. As a result, subscribers have no way of preventing use of their telephones to make unauthorized long distance telephone calls.

Accordingly, it is an object of the present invention to provide an electronic telephone call restricting device.

It is a further object of this invention to provide an electronic telephone call restricting device which is adapted to be installed at any point in the telephone line including the central office exchange, PABX or the subscriber's premises.

It is a still further object of this invention to provide an electronic telephone call restricting device which is operable in response to the first digit dialled.

The present invention comprises an electronic telephone call restricting device adapted to respond to the first digit dialled to disable the telephone circuit if said first digit is an unauthorized digit.

The present invention comprises first and second latch circuits and a telephone circuit disabling means, said first latch circuit operable in response to the dial signal of any initially dialled digit, said second latch circuit operable in response to the dial signal of any initially dialled digit except an unauthorized digit, said telephone circuit disabling means operable in response to the operation of said first latch circuit in the absence of the operation of said second latch circuit.

The features of the invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements; and in which:

Figure 1:
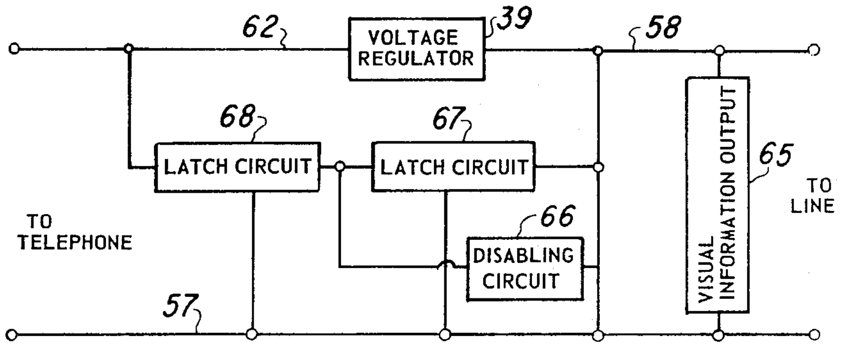
FIG. 1 is a block diagram of a circuit constructed in accordance with the present invention.

Referring now to FIG. 1, there is shown a block diagram of one embodiment of the present invention. When the first digit of a telephone number is dialled, one or more voltage pulses occur in lines 62 and 57. The first of such pulses activates latch circuit 68. If, after a short time delay, a second voltage pulse does not occur, i.e., when the digit 1 is dialled, disabling circuit 66 is activated and shorts lines 57 and 58, thereby preventing completion of the call. If, however, a second voltage pulse does occur before the disabling circuit is activated, as when any other digit except 1 is dialled, latch circuit 67 is activated by the second pulse and disabling circuit 66 is rendered inoperative and is thereby prevented from interfering with completion of the call.

Figure 2:
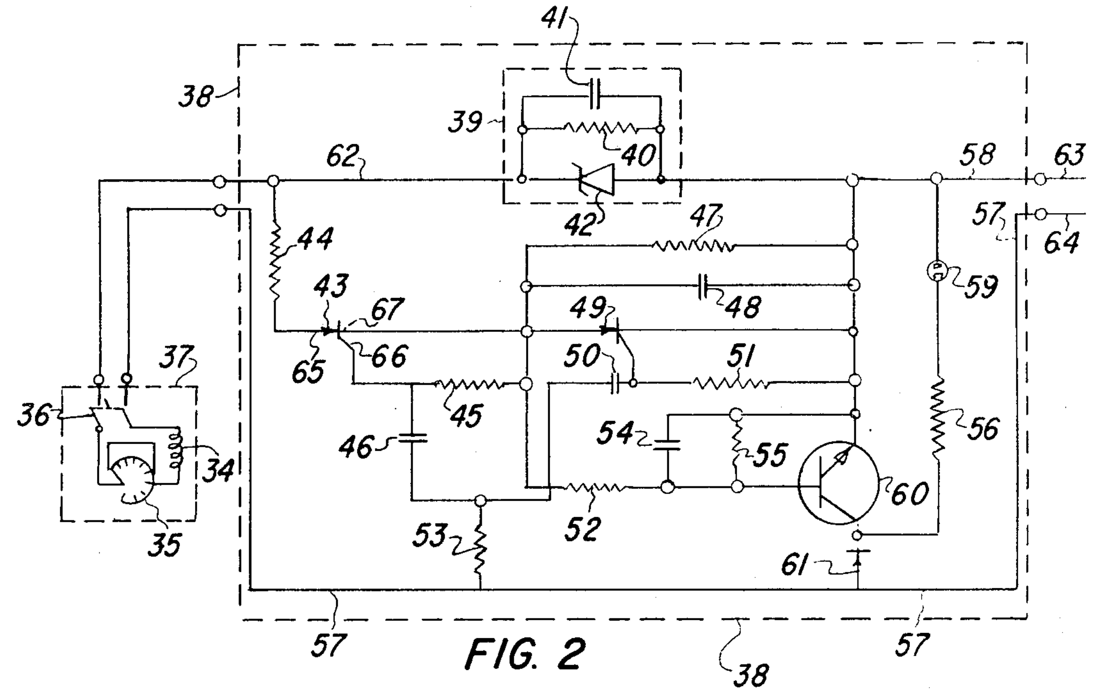
FIG. 2 is a circuit diagram of the embodiment of the invention shown in FIG. 1.

Referring now to the circuit diagram of the embodiment shown in FIG. 2, wires 57 and 62 of call restrictor 38 are connected to switch 36 in telephone 37. Telephone coil 34 and telephone dial 35 are connected to the other side of switch 36 as shown in FIG. 1. Wire 57 of call restrictor 38 is connected to the positive voltage line 64, and wire 58 is connected to the negative voltage line 63 of a telephone branch line.

When the telephone receiver is removed from its cradle, switch 36 closes and connects wire 57 and 62 of call restrictor 38 to telephone coil 34 and telephone dial 35. The low resistance of telephone coil 34 results in a substantial reduction in the voltage between wires 57 and 62 when switch 36 is closed.

When switch 36 is closed, current flows through wire 62, resistor 40 in voltage regulator 39 and wire 58. As current flows through resistor 40, capacitor 41 becomes charged. This provides a means for maintaining the voltage across voltage regulator 39 relatively constant when the current is momentarily interrupted during dialling. Zener diode 42 prevents the voltage across resistor 40 from exceeding a desired level.

As shown in FIG. 2, anode terminal 65 of silicon controlled rectifier 43 is connected through resistor 44 to wire 62. Cathode terminal 67 of silicon controlled rectifier 43 is connected through resistor 47 to wire 58. Gate terminal 66 of silicon controlled rectifier 43 is connected through capacitor 46 and resistor 53 to wire 57. The voltage between wires 57 and 62 is applied to the gate terminal 66 and anode terminal 65. Since this voltage is low when the receiver is lifted from its cradle, the silicon controlled rectifier 43 is not triggered into conducting. Consequently, no current flows through silicon controlled rectifier 43. It is to be noted that since no current is flowing through silicon controlled rectifier 43 the entire voltage across voltage regulator 39 is present across anode and cathode terminals 65 and 67 of silicon controlled rectifier 43.

The dialling of the digit 1 creates a single momentary break in the connection between wires 57 and 62 which causes the voltage between wires 57 and 62 to rise sharply during the period of the break. This voltage rise or pulse, which is transmitted to the anode terminal 65 of silicon controlled rectifier 43 through resistor 44 and to gate terminal 66 through resistor 53 and capacitor 46, triggers silicon controlled rectifier 43 causing it to become conductive in a path between anode terminal 65 and cathode terminal 67. It is to be noted that once the silicon controlled rectifier has been triggered, conduction is continuous and the gate circuit voltage exercises no further control over conduction.

Following the triggering of silicon controlled rectifier 43, the voltage drop across voltage regulator 39 causes a current to flow through resistor 44, through silicon controlled rectifier 43 and then in two parallel paths, one through resistor 47 and the other through resistors 52 and 55. The time required for the voltage across resistors 52 and 55 to reach a steady state value is extended by the presence of capacitor 48. The time required for the voltage across resistor 55 to reach a steady state value is further extended by the presence of capacitor 54. After the lapse of a predetermined time interval following the occurrence of the initial voltage pulse, the voltage across resistor 55 which is applied to the base and emitter terminals of transistor 60, reaches a level which causes transistor 60 to become conductive. Conduction by transistor 60 effectively shorts wires 57 and 58 and prevents further dialling signals from being transmitted by telephone lines 63 and 64. Lamp 59 indicates that the call restrictor is connected. Thus, it will be seen that the present invention when connected to a telephone line prevents the use of that telephone for the making of calls when the first digit dialled is 1.

When the telephone receiver is returned to its cradle current ceases to flow through resistor 55 and capacitor 54 is discharged through resistor 55, thus terminating conduction by transistor 60. Current also ceases to flow through resistor 40 in voltage regulator 39 and capacitor 41 is discharged through resistor 40. In the absence of a voltage drop across voltage regulator 39, conduction by the silicon controlled rectifier 43 ceases.

Considering now the operation of the circuit when the first number dialled is not an unauthorized number. The dialling of a digit other than 1 creates a series of momentary breaks in the connection between wires 57 and 62 which causes a corresponding series of voltage pulses in the wires. The first voltage pulse across wires 57 and 62 triggers silicon controlled rectifier 43 in the same manner as when the digit 1 is dialled. However, before the voltage across resistor 55 can reach a sufficient level to render transistor 60 conductive, a second voltage pulse occurs (since a digit other than 1 was dialled) which triggers silicon controlled rectifier 49 and creates a short circuit across resistors 52 and 55 thereby preventing transistor 60 from becoming conductive. In this state, call restrictor 38 does not interfere with completion of the dialling.

Figure 3:
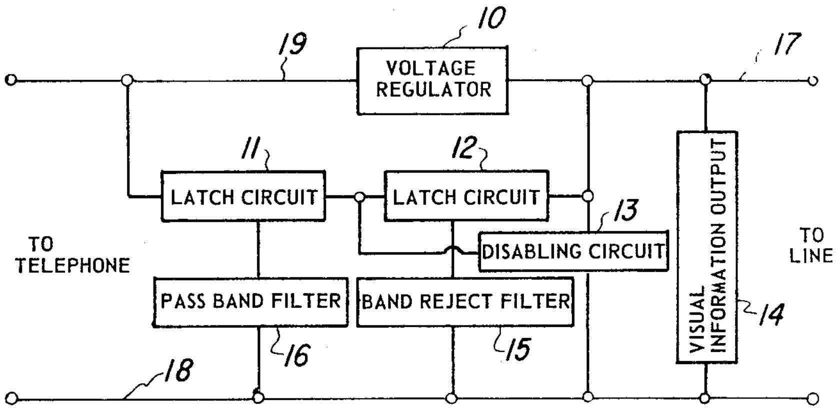
FIG. 3 is a block diagram of a further embodiment of the present invention.

Referring now to FIG. 3, there is shown an embodiment of the present invention which is adapted for operation with a Touch Tone dialling system. In a Touch Tone dialling system each digit dialled is represented by a signal of a different frequency. As shown in FIG. 3, voltage regulator 10 provides the voltage for operation of the device. Band pass filter 16 is responsive to the first digit dialled and passes all the dial signal frequencies. Band reject filter 15 is also responsive to the first digit dialled and passes all the dial signal frequencies except that of an unauthorized digit.

Thus, when the first digit dialled is an unauthorized digit, latch circuit 11 is activated which operates disabling circuit 13 thereby preventing completion of the call. If the first digit dialled is other than an unauthorized digit, both latch circuit 11 and latch circuit 12 are activated thereby preventing operation of disabling circuit 13 and allowing completion of the dialling.

It is to be understood that in accordance with the present invention, the unauthorized digit need not necessarily be 1, only, it may also include, for instance, the digit 0.

The embodiments of the invention in which an exclusive property or privilege is claimed are defined as follows:

1. A circuit for restricting use of a telephone including telephone signal conducting means, first and second circuit means, and time delayed telephone circuit disabling means;

said first circuit means being connected to said conducting means and responsive to a first dialed digit dial signal carried by said conducting means to connect said conducting means to said second circuit means and to activate said time delayed telephone circuit disabling means;

said disabling means being connected to said signal conducting means and being adapted to operate to prevent conduction of signals by said conduction means upon lapse of a delay interval following activation thereof;

said second circuit means being adapted to be responsive within said delay interval to said first dialed digit dial signal when said dial signal is that of a designated digit to prevent operation of said disabling means.

2. The circuit of claim 1 wherein said signal conducting means includes voltage regulator means adapted to provide circuit operating voltage across said signal conducting means; and, wherein said first circuit means is operable to apply said voltage to said telephone circuit disabling means for operating said telephone circuit disabling means.

3. The circuit of claim 1 wherein said signal conducting means includes first and second conductors, said first conductor including voltage regulator means adapted to provide a circuit operating voltage thereacross; and, wherein said first circuit means is adapted to be responsive to said first dial signal to apply said voltage to said disabling means and to said second circuit means.

4. The circuit of claim 3 wherein said first circuit means includes a latch circuit adapted to be responsive to a first dial signal pulse in said conducting means to connect said second circuit means to said conducting means and to activate said time delayed circuit disabling means; and, wherein said second circuit means includes a latch circuit adapted to be responsive to a dial signal pulse in said conducting means immediately following said first pulse to deactivate said telephone circuit disabling means.

5. The circuit of claim 3 wherein said first circuit means includes a first latch circuit, first latch circuit control means and a pass band filter, said control means being connected to said conduction means through said pass band filter, said latch circuit being adapted to be responsive to said first dial signal carried by said conducting means within the pass band frequency of said pass band filter to connect said conducting means to said second circuit means and to activate said telephone circuit disabling means; and, wherein said second circuit means comprises a second latch circuit, second latch circuit control means and a band reject filter, said second latch circuit control means being connected to said conduction means through said band reject filter, said band reject filter being adapted to block dial signals of frequencies other than said designated digit, said second latch circuit adapted to be responsive to said first dial signal when of a frequency of a designated digit to deactivate said telephone circuit disabling means within said delay interval.

6. A circuit adapted to prevent use of a telephone when the first dialed digit of a dialed number is other than a designated digit comprising:

signal conducting means adapted to carry the dial signal of a first dialed digit;

first circuit means connected to said conducting means;

second circuit means connected to said first circuit means; and, time delayed circuit disabling means connected to said first circuit means and to said conducting means, said time delayed circuit disabling means being adapted to be operable to prevent further conduction of signals by said conducting means upon lapse of a delay interval following the activation thereof;

said first circuit means being responsive to an initial portion of said first dial signal carried by said conducting means to connect said second circuit means to said conducting means and to activate said time delayed circuit disabling means;

said second circuit means being adapted to be responsive to a subsequent portion of said dial signal occurring within said delay interval when said dial signal is that of a designated digit to prevent operation of said circuit disabling means and thereby avoid termination of conduction of signals by said conducting means.

7. A circuit for restricting use of a telephone comprising:

first and second telephone signal conductors;

voltage regulator means in said first conductor adapted to provide circuit operating voltage thereacross;

first and second latch circuits, said latch circuits including conductor means, conductor switching means and switching control means, said switching control means being adapted to operate said conductor switching means to control conduction of said conductor means and said conductor means being connected in series across said voltage regulator means; and, a time delayed circuit disabling means including means to effectively short circuit said first telephone signal conductor to second telephone signal conductor and delay means connected to said first latch circuit conductor means adapted to provide a delay interval between operation of said first latch circuit and operation of said short circuiting means, said first latch circuit being adapted to operate in response to an initial pulse in a dial signal to provide a conductive path between second latch circuit and said first conductor and to apply said voltage across said disabling circuit means, said second latch circuit adapted to operate within said delay interval in response to a pulse occurring subsequent to said first voltage pulse to prevent operation of said circuit disabling means.

8. The circuit of claim 7 wherein said circuit disabling means includes a transistor having emitter and collector terminals connected to said first and second telephone signal conductors respectively, and an R. C. circuit connected to said base and said emitter terminals of said transistor and to said first circuit means, whereby the application of said voltage across said disabling circuit means triggers said transistor into conduction following a delay interval to effectively short circuit said first telephone signal conductor to said second telephone signal conductor.

9. The circuit of claim 8 wherein each of said first and said second latch circuits includes a silicon controlled rectifier, said silicon controlled rectifiers being separately triggered into conduction by means of dial signal pulses carried by said telephone signal conductors, said silicon controlled rectifiers and said transistor in said circuit disabling means being adapted to cease conduction upon termination of said voltage across said voltage regulator means, whereby the circuit is reset for repeat operation.

10. The circuit of claim 9 wherein said R. C. circuit is adapted to provide a delay interval greater than the interval between consecutive pulses produced by the dialing of a signal digit on a telephone.

11. The circuit of claim 7 including means to indicate operation of said circuit disabling means.

12. A circuit for restricting use of a telephone where the first dialed digit is a designated digit comprising:

signal conducting means adapted to carry telephone dial signals each of a different frequency including the dial signal of said first dialed digit;

voltage regulator means in said conducting means being adapted to provide a voltage thereacross;

a band pass filter;

a first latch circuit including control means connected to said signal conducting means through said pass band filter;

a band reject filter adapted to block dial signals of the frequencies of said designated digits;

a second latch circuit connected to said first latch circuit including control means connected to said signal conducting means through said band reject filter; and, a time delayed circuit disabling means connected to said signal conducting means and to said first latch circuit, said circuit disabling means being adapted to be activated by application thereto of said voltage across said voltage regulating means to prevent transmission of signals by said signal conducting means upon elapse of a delay interval;

said first latch circuit being operable in response to the dial signal of said first dialed digit within the pass frequency of said pass band filter to connect said second latch circuit to said signal conducting means and to apply said voltage to said time delayed disabling circuit;

said second latch circuit being adapted to operate in response to said first dial signal occurring within said delay interval when outside the frequency range blocked by said band reject filter to prevent operation of said disabling circuit.

* * * * *

UNITED STATES PATENT OFFICE

CERTIFICATE OF CORRECTION

Patent No. 3,681,536 Dated August 1, 1972

Inventor(s) Arthur H. Pask; Robert E. Sparrow; and Roger J. Boulanger

It is certified that error appears in the above-identified patent and that said Letters Patent are hereby corrected as shown below:

Please change the Assignee from "International Electric Research & Equipment Ltd." to --Ronald Charles B. Smith and S. Gordon Phillips--.

Signed and sealed this 17th day of April 1973.

(SEAL)
Attest:

EDWARD M.FLETCHER,JR.
Attesting Officer

ROBERT GOTTSCHALK
Commissioner of Patents